United States Patent Office 2,805,963
Patented Sept. 10, 1957

2,805,963

COATING OF POLYETHYLENE TEREPHTHALATE FILM

Norman Grant Gaylord, Westbury, N. Y., assignor to E. I. du Pont de Nemours and Company, Wilmington, Del., a corporation of Delaware No Drawing. Application September 7, 1955, Serial No. 533,000

9 Claims. (Cl. 117—138.8)

This invention relates to a process of coating polyethylene terephthalate film and, more particularly, to a process for coating polyethylene terephthalate film with an aqueous dispersion of a vinylidene chloride copolymer.

The novel class of fiber- and film-forming linear polyesters of terephthalic acid and a glycol of the series $HO(CH_2)_nOH$, wherein "$n$" is an integer from 2–10, inclusive, is fully described in U. S. Patent No. 2,465,319 to Whinfield & Dickson. One of the most attractive polymers of this class, for conversion into films, is polyethylene terephthalate, and this invention is concerned with the further treatment of film formed from polyethylene terephthalate.

The tensile strength, as well as other desirable characteristics of polyethylene terephthalate film, are greatly enhanced by orienting the film in a stretching and/or rolling operation followed by heat-setting the film. Orienting, however, increases the degree of crystallinity and effects other micro-structural changes which tend to impair some of the remaining physical properties of the film. For example, after orienting polyethylene terephthalate film, it is no longer possible to heat-seal the film with most conventional heat-sealing apparatus and obtain durable bonds. Attempts to heat-seal the film with most conventional apparatus results in severe shrinkage of the film with attendant puckering and weakness at the seal.

Recognizing the above major obstacle to wider commercial use of polyethylene terephthalate film, it has been proposed to coat the film with a composition which will render the film heat-sealable at moderate temperatures and with existing commercial apparatus. Specifically, it has been suggested to employ for this purpose coatings of vinylidene chloride copolymers applied from aqueous dispersions inasmuch as these copolymers, so applied, have proven their worth as heat-sealable coatings for other films, e. g., cellophane. However, in applying known dispersions of vinylidene chloride copolymer onto polyethylene terephthalate film, it has been found extremely difficult to obtain a clear (i. e., transparent coating which will at the same time provide for making heat-seal bonds having the necessary strength.

An object of the present invention, therefore, is to provide an oriented, polyethylene terephthalate film having a transparent, adherent coating of vinylidene chloride copolymer which is heat-sealable on present day, heat-sealing equipment to produce seals of satisfactory strength and appearance. Another object is to provide a process of coating vinylidene chloride copolymer from an aqueous dispersion thereof onto an oriented, polyethylene terephthalate film to produce a film which is more readily heat-sealable and which retains substantially the original degree of transparency of the base film. The foregoing and other objects will more clearly appear hereinafter.

These objects are accomplished in accordance with the present invention which, briefly stated, comprises coating an oriented, polyethylene terephthalate film with an aqueous dispersion of a copolymer obtained from 80–97% vinylidene chloride and 3–20% of at least one other polymerizable monoolefinic monomer copolymerizable therewith, said aqueous dispersion containing at least 1%, by weight, based upon the weight of the copolymer in the dispersion, of at least one compound from the group consisting of the alkali metal and ammonium alkyl benzene sulfonates.

The present invention resides in the discovery that the presence of at least 1% of the alkali metal or ammonium alkyl benzene sulfonate in the aqueous coating dispersion of the vinylidene chloride copolymer to be applied to an oriented, polyethylene terephthalate base film yields a clear, transparent coating capable of being heat-sealed to form seals of exceptional strength. In contrast, the use of other types of surface-active agents for applying such vinylidene chloride copolymers either gives a clear coating which provides for heat-seals having a relatively low bond strength level, or gives hazy coatings which have an acceptable level of heat-seal bond strength.

The alkali metal or ammonium alkyl benzene sulfonates suitable for purposes of this invention are obtained commercially in the form of a mixture of such compounds wherein the alkyl group contains from 5–20 carbon atoms in the molecule.

In order that the coated polyethylene terephthalate films produced in accordance with the present invention are sufficiently impermeable to moisture vapor, the coating should contain at least 80% of the vinylidene chloride component, and preferably at least 90%, and up to 93%, thereof. As polymerizable mono-olefinic monomers which may be copolymerized with vinylidene chloride, the monomers selected from the group consisting of alkyl acrylates containing up to 8 carbon atoms in the alkyl group, acrylonitrile and itaconic acid constitute the preferred compounds and the invention will be further described with specific reference to copolymers derived from vinylidene chloride and one or more of these monomers. However, the process of the present invention is not limited to these. Other polymerizable monomers may also be used. The list includes: methyl, ethyl, isobutyl, butyl, octyl and 2-ethylhexyl acrylates and methacrylates; phenyl methacrylate, cyclohexyl methacrylate, p-cyclohexylphenyl methacrylate, ethoxyethyl methacrylate, chloroethyl methacrylate, 2-nitro-2-methypropyl methacrylate, and the corresponding esters of acrylic acid: methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or mono-alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U. S. Patent No. 2,160,943. These compounds may be described as vinyl or vinylidene compounds having a single

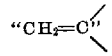

group. The most useful ones fall within the general formula

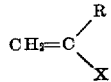

wherein R may be hydrogen, a halogen or a saturated aliphatic radical and X is selected from one of the following groups:

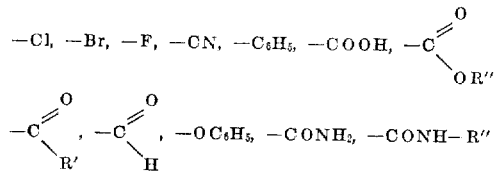

and —CONR₂′ in which R′ is alkyl.

At the time of applying the vinylidene chloride copolymer to the base film from an aqueous dispersion, the concentration of the alkali metal or ammonium alkyl benzene sulfonate in the coating dispersion should be at least 1%, by weight, based upon the total weight of the vinylidene chloride copolymer. It is immaterial as to the time at which the alkali metal or ammonium alkyl benzene sulfonate is added to the coating dispersion so long as it is added prior to the coating operation. In other words, the compound may be employed as a dispersing agent in preparing the aqueous dispersion of vinylidene chloride copolymer in known manner. Hence, it may be added with the initial charge of monomers and catalysts to the aqueous medium prior to polymerization of the copolymer in dispersed form. On the other hand, the compound may be added subsequent to polymerization of the copolymer and prior to the coating operation.

It is to be understood that other types of surface-active agents useful as dispersing agents and wetting agents may be added to the aqueous system in addition to the alkali metal or ammonium alkyl benzene sulfonate. The examples to be presented hereinafter, illustrate the addition of other types of surface-active agents to the aqueous system, such as, "Duponol" ME (E. I. du Pont de Nemours & Co., Inc.), which is sodium lauryl sulfate, "Darvan" No. 1 (R. T. Vanderbilt Co.), which is sodium beta-naphthalene sulfonate condensed with formaldehyde, "Aerosol" OT (American Cyanamid Co.), which is di-octyl sulfosuccinate, and "Triton" X–100 (Rohm & Haas Co.), which is an alkyl aryl polyglycol ether. These examples will also show, however, that the use of such surface-active agents as those compounds sold under the trade name of "Duponol" or "Darvan," in the absence of the ammonium or alkali metal alkyl benzene sulfonates of this invention, leads to form certain coated (with vinylidene chloride copolymers) polyethylene terephthalate films which are either hazy in appearance or which, when heat-sealed, form bonds at a comparatively lower strength level.

The following examples further illustrate the principles and practice of this invention. Percentages are by weight unless otherwise indicated.

EXAMPLE 1

A base film of polyethylene terephthalate, 1.0 mil thick stretched three times its original dimensions in two directions and heat-set at about 200° C. while under tension, was coated with an aqueous copolymer dispersion prepared by placing 1.5 pounds of "Sulframin" AB (a mixture of sodium salts of an alkyl benzene sulfonate; containing 90% of sodium dodecyl benzene sulfonate), 102 grams of ammonium persulfate and 120 pounds of water in a vessel fitted with a stirrer and a reflux condenser. After dissolving these components by stirring, 135 pounds of vinylidene chloride and 15 pounds of methylacrylate were introduced and the mixture refluxed at 35° C. A solution of 51 grams of metasodium bisulfite in 1.5 pounds of water was added and the mixture stirred until refluxing ceased, thereby indicating completion of polymerization. Three pounds of "Duponol" ME (sodium lauryl sulfate) in 10 pounds of water was added to the copolymer dispersion subsequent to polymerization in order to stabilize the copolymer against coagulation and to act as a wetting agent in the subsequent coating step.

The polyethylene terephthalate base film was coated by passing it through a bath of the polymeric dispersion prepared as above described. Contact time was sufficient to allow the base film to retain a slight excess of the coating. The excess was removed by doctoring as the coating was made smooth and brought to the desired thickness. The coated film was dried at a temperature between 120° and 130° C. The total coating weight of the copolymer on the film was 10.4 gms./m.²

The resulting film retained its strength, high gloss and clarity. The following table summarizes the heat-seal bond strength of the film of Example 1 along with the heat-seal bond strength for films of Examples 2 and 3, inclusive, which films were prepared in the same manner as the film of Example 1 except that 2 and 3% of "Sulframin" AB, respectively, was used as a dispersing agent in the preparation of the copolymer coating. Example 4, which is also summarized in the following table and which is not within the scope of the present invention, represents film prepared in a manner similar to that described in Example 1 but represents the addition of only 0.5% of "Sulframin" used as the dispersing agent. It should be emphasized that the film of Example 4 was hazy.

*Table I*

APPLICATION OF COPOLYMER OF VINYLIDENE CHLORIDE/METHYL ACRYLATE (90/10) COATING TO POLYETHYLENE TEREPHTHALATE FILM

| Example | Dispersing Agent and Concentration | Wetting Agent and Concentration | Coating, Wt. gms./m.² | IPV, 39.5° C. | | Heat-Seals at 150° C. | | | | | | | | | | | |
|---|---|---|---|---|---|---|---|---|---|---|---|---|---|---|---|---|
| | | | | | | 35% Relative Humidity | | | | | | 93% Relative Humidity | | | | | |
| | | | | 1st 24 hrs. | 2nd 24 hrs. | Initial | | | Peel | | | Initial | | | Peel | | |
| | | | | | | Av. | Hi. | Lo. | Av. | Hi. | Lo. | Av. | Hi. | Lo. | Av. | Hi. | Lo. |
| 1 | 1% "Sulframin" AB | 2.0% "Duponol" ME | 10.4 | 26.3 | 14.6 | 557 | 615 | 430 | 607 | 660 | 535 | 435 | 570 | 365 | 417 | 420 | 415 |
| 2 | 2% "Sulframin" AB | do | 10.8 | 34.6 | 20.9 | 551 | 760 | 440 | 541 | 635 | 445 | 236 | 300 | 150 | 380 | 380 | 175 |
| 3 | 3% "Sulframin" AB | do | 11.3 | 30.0 | 21.9 | 503 | 650 | 380 | 475 | 655 | 310 | 350 | 510 | 205 | 422 | 505 | 355 |
| 4 | 0.5% "Sulframin" AB | do | ¹9.6 | 28.2 | 20.4 | 448 | 480 | 425 | 235 | 320 | 170 | 342 | 415 | 260 | 197 | 300 | 115 |

¹ Coated film was hazy.

The physical properties given in Table I and in subsequent examples were determined as follows:

*Total coating weight*—was determined by immersing a portion of the film in cyclohexanone at room temperature for 15 minutes or longer if necessary to dissolve the coating entirely; rinsing in ethyl acetate; drying overnight at room temperature and 35% relative humidity. The sample was weighed before and after the treatment, to determine the coating weight.

*Moisture vapor permeability*—was determined by placing the test film over the top of an aluminum cup containing 15 milliliters of water, the test area being 33.3 square centimeters. The assembly was weighed accurately and then placed in a dry (less than 3% relative humidity) air-swept oven at 39.5° C. for 24 hours. The assembly was removed from the oven, cooled to room temperature and reweighed. The weight loss was converted to grams of water lost/100 square meters/hour.

*Heat-seal strength*—was measured by cutting a piece of the coated film 4" x 10" with a grain running in the long direction into two pieces 4" x 5". The two pieces ethylene terephthalate film was coated in a manner similar to that described in Example 1. In general, those coated films prepared from dispersions formed in the presence of a "Duponol" as both the dispersing agent and the wetting agent were hazy in appearance. On the other hand, those films coated with dispersions prepared in the presence of a "Darvan" as the dispersing agent or as the wetting agent exhibited a generally lower level of heat-seal bond strength.

Table II

APPLICATION OF COPOLYMER OF VINYLIDENE CHLORIDE/METHYL ACRYLATE (90/10) COATING TO POLYETHYLENE TEREPHTHALATE FILM

| Example | Dispersing Agent and Concentration | Wetting Agent and Concentration | Coating, Wt. gms./m.² | IPV, 39.5° C. | | Heat-Seals at 150° C. | | | | | | | | | | | |
|---|---|---|---|---|---|---|---|---|---|---|---|---|---|---|---|---|
| | | | | | | 35% Relative Humidity | | | | | | 93% Relative Humidity | | | | | |
| | | | | 1st 24 hrs. | 2nd 24 hrs. | Initial | | | Peel | | | Initial | | | Peel | | |
| | | | | | | Av. | Hi. | Lo. | Av. | Hi. | Lo. | Av. | Hi. | Lo. | Av. | Hi. | Lo. |
| 5 | 2% "Duponol" ME | 2.0% "Dupunol" ME | [2] 10.7 | 21.8 | 24.4 | 634 | 760 | 460 | 505 | 670 | 420 | 938 | 1,290 | 450 | 811 | 1,110 | 600 |
| 6 | 2% "Darvan" #1 [1] | do | 12.1 | 27.2 | 23.1 | 78 | 115 | 50 | 80 | 105 | 45 | 334 | 410 | 240 | 29 | 45 | 20 |
| 7 | do | 2.0% "Darvan" #1 | 10.3 | 34.1 | 23.5 | 310 | 420 | 200 | 215 | 265 | 165 | 25 | 35 | 10 | 34 | 60 | 15 |

[1] Sodium beta-naphthalene sulfonate condensed with formaldehyde.
[2] Coated film was hazy.

were superimposed so that opposite surfaces were in contact. The two pieces of superimposed film were then sealed together at each end at right angles to the grain. A ¾" wide sealing bar heated to a temperature of 150° C. at 20 pounds per square inch pressure and a dwell of 2 seconds was employed for sealing the films. Sealed sheets were then cut in half at right angles to the grain. From the center of the four resulting pieces, 1½" wide strips parallel to the grain were cut. The four sets of strips were then conditioned for 2 to 3 days at the desired relative humidity as indicated (the film itself was conditioned for 2 to 3 days at 35% relative humidity before the actual seals were made). The seal strengths were determined by opening each set of strips at the free ends, placing them in a Suter testing machine and pulling them apart. The initial seal strength was the force in grams required to begin the separation of the sealed area, and the peel strength value was the highest force in grams required to pull the strips of films apart.

The following Examples, 5, 6 and 7, are not within the scope of the present invention, and are included to illustrate and typify the results obtained in using other types of surface-active agents for the dispersing agent and the wetting agent in preparing the vinylidene chloride copolymers and applying them to polyethylene terephthalate film in the form of an aqueous dispersion. The copolymer dispersions were prepared, and the poly- The following examples summarized in Table III, Examples 8–13, inclusive, illustrate additional embodiments of the present invention wherein an alkali metal alkyl benzene sulfonate is employed as the dispersing agent in the preparation of the vinylidene chloride copolymer or is employed as the wetting agent in the aqueous dispersion of the copolymer coating, or is employed as both the dispersing agent and the wetting agent. Furthermore, these examples illustrate the use of the alkali metal alkyl benzene sulfonate in combination with other surface-active agents as the dispersing agent in the preparation of the copolymer dispersion and as the wetting agent in the dispersion coating bath.

Table III

APPLICATION OF COPOLYMER OF VINYLIDENE CHLORIDE/METHYL ACRYLATE (90/10) COATING TO POLYETHYLENE TEREPHTHALATE FILM

| Example | Dispersing Agent and Concentration | Wetting Agent and Concentration | Coating, Wt. gms./m.² | IPV, 39.5° C. | | Heat-Seals at 150° C. | | | | | | | | | | | |
|---|---|---|---|---|---|---|---|---|---|---|---|---|---|---|---|---|
| | | | | | | 35% Relative Humidity | | | | | | 93% Relative Humidity | | | | | |
| | | | | 1st 24 hrs. | 2nd 24 hrs. | Initial | | | Peel | | | Initial | | | Peel | | |
| | | | | | | Av. | Hi. | Lo. | Av. | Hi. | Lo. | Av. | Hi. | Lo. | Av. | Hi. | Lo. |
| 8 | 2% "Sulframin" AB | 2% "Duponol" ME | 9.3 | 31.9 | 18.8 | 698 | 845 | 410 | 605 | 970 | 235 | 604 | 785 | 370 | 635 | 795 | 450 |
| 9 | do | 2% "Sulframin" AB | 12.0 | 32.2 | 16.9 | 449 | 660 | 260 | 319 | 425 | 220 | 294 | 395 | 250 | 373 | 525 | 245 |
| 10 | do | 2% "Duponol" ME | 8.6 | 29.1 | 27.5 | 319 | 400 | 285 | 413 | 470 | 330 | 291 | 355 | 235 | 205 | 280 | 155 |
| 11 | do | {1% "Sulframin" AB, 1% "Duponol" ME} | 9.4 | 31.0 | 21.3 | 410 | 450 | 370 | 365 | 400 | 290 | 347 | 550 | 200 | 225 | 310 | 150 |
| 12 | do | {1% "Aerosol" OT [1]} | 11.2 | 22.5 | 21.3 | 410 | 540 | 270 | 408 | 470 | 340 | 418 | 510 | 350 | 443 | 600 | 290 |
| 13 | do | {1% "Aerosol" OT, 2% "Triton" X-100 [2]} | 9.2 | 35.4 | 33.8 | 496 | 620 | 395 | 506 | 645 | 375 | 612 | 765 | 470 | 547 | 600 | 425 |

[1] Dioctyl sodium sulfosuccinate.
[2] An alkyl aryl polyglycol ether.

The following examples in Table IV (Examples 14–20, inclusive) illustrate the application of clear vinylidene chloride copolymers from aqueous dispersions onto polyethylene terephthalate film in accordance with the same technique described hereinbefore. These examples specifically illustrate application of vinylidene chloride copolymers wherein more than one additional monomeric compound is copolymerized with vinylidene chloride. Furthermore, these examples illustrate other types of monomers which may be selected from a large group of mono-olefinically unsaturated monomeric compounds which are copolymerizable with vinylidene chloride. All of these coatings were clear, and the bond strengths of heat-seals made with the resulting coated film were at a satisfactorily high level.

Table IV

| Example | Coating Composition | Wetting Agent and Concentration | Wetting Agent and Concentration | Coating Weight | IPV, 39.5° C. | | 35% Relative Humidity | | | | | | 93% Relative Humidity | | | | | | |
|---|---|---|---|---|---|---|---|---|---|---|---|---|---|---|---|---|---|---|
| | | | | | 1st 24 hrs. | 2nd 24 hrs. | Initial | | | Peel | | | Initial | | | Peel | | | |
| | | | | | | | Av. | Hi. | Lo. | Av. | Hi. | Lo. | Av. | Hi. | Lo. | Av. | Hi. | Lo. |
| 14 | VCl₂/AN/MA/IA, 90/5/5/1 | 2% "Duponol" ME | 2% "Duponol" ME, 2% "Sulframin" AB | 8.4 | 34.4 | 27.5 | 593 | 740 | 520 | 603 | 670 | 540 | 768 | 930 | 620 | 826 | 1,050 | 595 |
| 15 | VCl₂/MA/IA, 90/10/1 | do | 2% "Sulframin" AB | 9.7 | 38.8 | 28.2 | 625 | 720 | 500 | 468 | 540 | 360 | 597 | 820 | 420 | 612 | 730 | 460 |
| 16 | VCl₂/MA/IA, 90/10/1 | 2% "Sulframin" AB | 4% "Duponol" ME | 10.3 | 37.2 | 26.3 | 606 | 685 | 485 | 353 | 605 | 180 | 563 | 650 | 465 | 635 | 750 | 430 |
| 17 | VCl₂/MA/IA, 90/10/0.5 | do | 2% "Sulframin" AB | 13.8 | 22.2 | 16.3 | 958 | 1,170 | 420 | 640 | 780 | 510 | 604 | 920 | 450 | 600 | 970 | 500 |
| 18 | VCl₂/EA/IA, 90/10/1 | 2% "Duponol" ME | 1% "Sulframin" AB | 11.1 | 39 | 37 | 675 | | | 440 | | | | | | | | |
| 19 | VCl₂/EA/IA, 90/10/1 | do | 2% "Sulframin" AB | 10.2 | 58 | 49 | 565 | | | 330 | | | | | | | | |
| 20 | VCl₂/MA/EA/IA, 90/5/5/1 | do | 1% "Sulframin" AB | 8.8 | 49 | 39 | 480 | 1,010 | 300 | 360 | | | | | | | | |

VCl₂—vinylidene chloride.
AN—acrylonitrile.
MA—methyl acrylate.
IA—itaconic acid.
EA—ethyl acrylate.

The coated films of this invention are useful as packaging materials for foods, cigarettes, textiles, hardware, and similar types of packaging end uses.

I claim:

1. The process which comprises coating oriented, polyethylene terephthalate film with an aqueous dispersion of a copolymer of vinylidene chloride copolymerized with at least one other polymerizable mono-olefinic monomer, said copolymer containing from 80–97% vinylidene chloride, said dispersion containing at least 1% by weight, based on the weight of copolymer, of at least one dispersing agent selected from the group consisting of the alkali metal and ammonium alkyl benzene sulfonates wherein the alkyl group contains from 5 to 20 carbon atoms, and thereafter drying said coated film.

2. The process of claim 1, wherein the film is biaxially-oriented, heat-set, polyethylene terephthalate film.

3. The process which comprises coating oriented, polyethylene terephthalate film with an aqueous dispersion of a copolymer of vinylidene chloride and an alkyl acrylate containing up to 8 carbon atoms in the alkyl group, said copolymer containing from 80–97% vinylidene chloride, said dispersion containing at least 1% by weight, based on the weight of copolymer, of at least one dispersing agent selected from the group consisting of the alkali metal and ammonium alkyl benzene sulfonates wherein the alkyl group contains from 5 to 20 carbon atoms, and thereafter drying said coated film.

4. The process, according to claim 3, wherein the alkyl acrylate is methyl acrylate.

5. The process, according to claim 3, wherein said dispersing agent is sodium dodecyl benzene sulfonate.

6. The process, according to claim 3, wherein said copolymer contains acrylonitrile.

7. The process, according to claim 3, wherein said copolymer contains itaconic acid.

8. The process which comprises coating oriented, polyethylene terephthalate film with an aqueous dispersion of a copolymer of vinylidene chloride and methyl acrylate, said copolymer containing 90% vinylidene chloride and 10% methyl acrylate, said dispersion containing at least 1% by weight, based on the weight of copolymer, of at least one dispersing agent selected from the group consisting of the alkali metal and ammonium alkyl benzene sulfonates wherein the alkyl group contains from 5 to 20 carbon atoms, and thereafter drying said coated film.

9. The process, according to claim 8, wherein the dispersing agent is sodium dodecyl benzene sulfonate.

References Cited in the file of this patent

UNITED STATES PATENTS 2,570,748    Petzl _____ Oct. 9, 1951

UNITED STATES PATENT OFFICE
Certificate of Correction

Patent No. 2,805,963 September 10, 1957

Norman Grant Gaylord

It is hereby certified that error appears in the printed specification of the above numbered patent requiring correction and that the said Letters Patent should read as corrected below.

Column 1, line 53, for "(i. e., transparent" read —(i. e., transparent)—; column 3, lines 2 to 5, for

line 8, for "—CONH—R'''" read — —CONH—R' —; columns 5 and 6, Table II, third column thereof, under the heading "Wetting Agent and Concentration," line 1 thereof, for ' "Dupunol" ' read —"Duponol"—.

Signed and sealed this 11th day of March 1958.

[SEAL]

Attest:
KARL H. AXLINE,
*Attesting Officer.*

ROBERT C. WATSON,
*Commissioner of Patents.*